United States Patent [19]

Roberts

[11] 4,306,755
[45] Dec. 22, 1981

[54] GAS TURBINE ROTOR SUPPORT SYSTEMS

[75] Inventor: Derek A. Roberts, Bristol, England

[73] Assignee: Rolls-Royce Limited, London, England

[21] Appl. No.: 135,676

[22] Filed: Mar. 31, 1980

[30] Foreign Application Priority Data

Apr. 7, 1979 [GB] United Kingdom ............... 12300/79

[51] Int. Cl.³ .................... F16C 13/00; F16C 33/00; F16C 35/00
[52] U.S. Cl. ............................. 308/189 R; 308/188; 308/191; 308/207 R
[58] Field of Search ............... 308/189 R, 207 R, 188, 308/202, 208, 191, 9, 178, 195; 60/39.16; 415/60

[56] References Cited

U.S. PATENT DOCUMENTS

| 2,390,353 | 12/1945 | Boysky ........................... 308/189 R |
| 3,446,542 | 5/1969 | Whitehurst ..................... 308/189 R |
| 3,484,144 | 12/1969 | Nash .............................. 308/195 |
| 3,491,536 | 1/1970 | Hadaway ..................... 308/189 R X |

*Primary Examiner*—Henry K. Artis
*Attorney, Agent, or Firm*—Stevens, Davis, Miller & Mosher

[57] ABSTRACT

A rotor assembly, particularly for a gas turbine engine, comprising a torsionally stiff drive shaft 16 mounted at two spaced locations in first and second bearings 22,23 which are substantially immovable bodily in radial directions. The drive shaft 16 has a flexible end portion 15 constituted by a shaft 25, projecting beyond the first bearing 23 which is more flexible in bending than the span of the drive shaft 16 between the first and second bearings 22,23. A support means 27 is mounted for rotation in a third bearing 28. The rotor 11 is mounted on the flexible end portion 15 of the drive shaft 16 to be driven thereby and is also mounted on the support means 27 for rotation in the third bearing 28. The third bearing 28 is capable of accommodating radial deflections of the support means 27 when the rotor becomes unbalanced.

9 Claims, 3 Drawing Figures

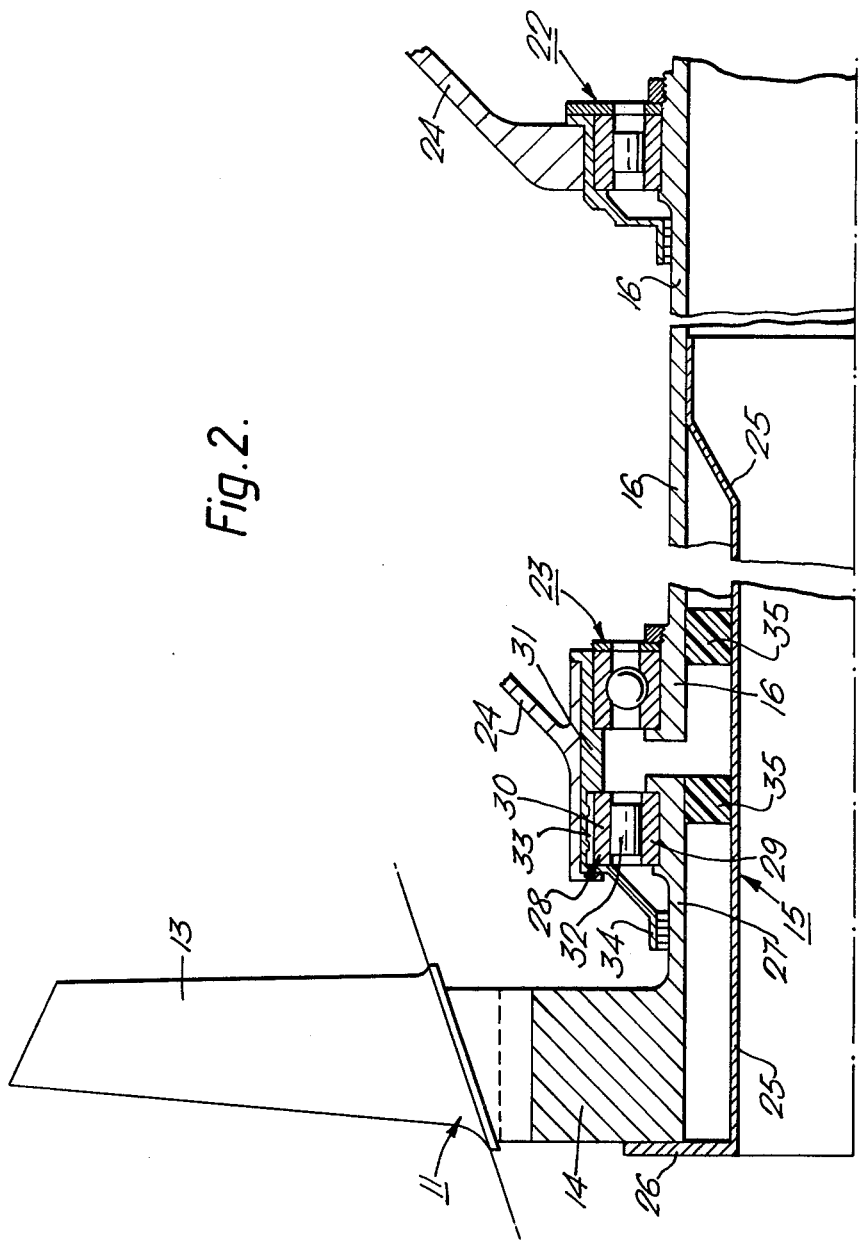

GAS TURBINE ROTOR SUPPORT SYSTEMS

DESCRIPTION

This invention relates to the supporting and driving of rotors of gas turbine engines, and is particularly concerned with the problem of supporting and driving such rotors when the mass of the rotor becomes unbalanced and inversion of the rotor is permitted.

Imbalance of rotors, such as large compressor fans of gas turbine engines, can occur when part, or whole, of a fan blade becomes detached from the fan disc whilst the engine is running.

When a blade is lost the rotor experiences a large out-of-balance load which causes the rotor to orbit bodily about its original axis of rotation. After a limited number of revolutions in this essentially unstable condition the rotor inverts, that is to say, it alters its mode of rotation so that its new rotational axis passes through its new centre of gravity and consequently assumes a stabilised rotation.

Inversion only occurs when the rotor is running well above its natural frequency. During normal running the natural frequency of the rotor is designed to be well above the maximum engine speed (typically 30% higher). When a blade comes off it is therefore necessary to lower the natural frequency of the rotor in some way to allow the rotor to invert.

A number of prior proposals for coping with unbalanced running and inversion of the rotor have been suggested in the past. The first category of such proposals recognises the need to mount the rotor drive shaft in bearings that are relatively immovable in radial directions and which are designed only to cope with the usual loads experienced during normal balanced running. This enables one to simplify the design of engines, for example, by reducing the number of bearings supporting the drive shaft to two instead of the usual three. Out-of-balance running, and inversion of the rotor is compensated without unduly loading the drive shaft bearings by mounting the rotor on flexible supports which employ frangible couplings.

British Patent Application Nos. 49445/73 and 52406/76 and co-pending British Patent Application, Ser. No. 135,676 naming Henry Roy Briggs as inventor describe examples of this approach. In all of these latter mentioned patent applications the rotor is supported directly in a bearing via a frangible coupling which breaks when the rotor becomes unbalanced. When the coupling breaks the rotor is no longer supported directly in the bearing. The frangible coupling imposes constraints on the designer since, in some of the aforementioned designs, it must be strong enough to transmit torsional drive but weak enough to fail when the rotor becomes imbalanced.

The present invention obviates the use of a separate frangible coupling which breaks the connection between the rotor and its bearing.

A second category of prior proposals comprises the concept of mounting the drive shaft in three main bearings at least one of which is capable of floating or being permanently deformed only when imbalance and inversion of the rotor occurs. Examples of such solutions are to be found in our British Pat. Nos. 1,421,377, 1,418,907 and 1,421,540. In all of these designs the whole of the drive shaft is allowed to deflect to assume inverted running. In engines with the rotor drive shaft mounted in three bearings one can arrange for the bearing nearest to the rotor to float or become permanently deformed when imbalance of the rotor occurs, because the shaft can be satisfactorily supported in the other two bearings. The second nearest bearing to the rotor is located at or near the node of the inverted running and is constructed to accommodate deflection of the drive shaft as described in British Pat. No. 1,318,629.

An object of the present invention is to provide a gas turbine engine wherein the rotor drive shaft is supported in main bearings which are substantially immovable in radial directions whilst supporting the rotor in its own bearing which is capable of being deflected bodily radially when the rotor becomes unbalanced.

According to the present invention there is provided a rotor assembly comprising a torsionally stiff drive shaft mounted at two spaced locations in first and second bearing means which are substantially immovable bodily in radial directions; the drive shaft having a flexible end portion projecting beyond the first bearing means, which is more flexible in bending than the span of the drive shaft between the first and second bearings; a support means mounted for rotation in a third bearing means; and a rotor mounted on the flexible end portion of the drive shaft to be driven thereby and also mounted on the support means for rotation in the third bearing means, the third bearing means being capable of accommodating radial deflections of the support means when the rotor becomes unbalanced.

Preferably the first and third bearing means are assembled at one location to define a common assembly. The third bearing means may comprise a conventional roller or ball race thrust bearing mounted in a crushable, or otherwise deformable mounting. The mounting may be one which is deformable plastically or elastically or by shear failure.

The third bearing may be supported by a squeeze-film. An example of such a bearing is described in British Pat. No. 957,317.

Preferably the drive shaft is a hollow cylinder and the flexible end portion of the drive shaft comprises a second torsionally stiff shaft positioned in the bore of the drive shaft and secured at one end to the drive shaft at a location intermediate the first and second bearing means.

The invention will now be described by way of an example only with reference to the accompanying drawings, in which:

FIG. 2 shows in greater detail a part sectional elevation of the front fan assembly of the engine of FIG. 1;

Figure 1:
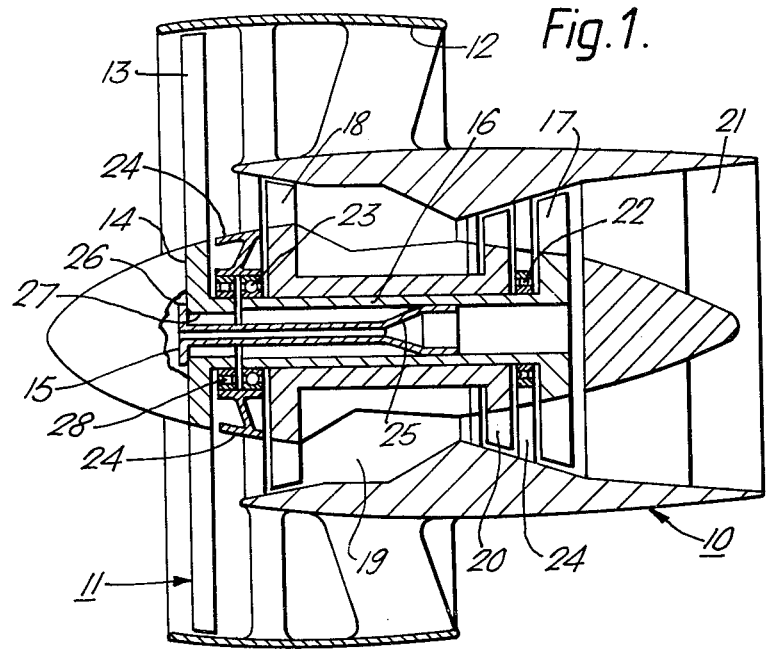
FIG. 1 is a schematic illustration of a gas turbine aero-engine incorporating the present invention.

Referring now to the drawings, FIG. 1 shows a ducted fan engine 10 having a front fan rotor 11 mounted for rotation in a duct 12. The fan rotor comprises a plurality of fan blades 13 secured by conventional blade fixing methods to the perimeter of a rotor disc 14.

The rotor disc 14 is mounted on a flexible end portion of a drive shaft 16 which is driven by a turbine 17. The turbine 17 is itself driven by an efflux of gases from a gas generator, or core engine. The gas generator is of any conventional type and includes one or more further compressors 18, combustion equipment 19, and turbines 20. The efflux of gases from the gas generator is discharged through the jet pipe 21 at the rear of the engine.

Referring to FIG. 2, the drive shaft 16 is supported in two main bearings 22,23 carried by fixed structure 24 of the engine casing. The front bearing 23 is a ball race thrust bearing and the rear bearing 22 is a roller race journal bearing. The turbine 17 (not shown in FIG. 2) is mounted on the drive shaft 16 in a conventional manner at a location to the rear of the rear bearing 22.

The flexible end portion 15 of the drive shaft 16 projects forward beyond the front bearing 23 and is constituted by a second shaft 25. The shaft 25 is torsionally stiff, that is to say, that torque developed by the turbine 17 can be transmitted by the shaft 25 to the front fan rotor 10. The shaft 25 is located in the bore of the drive shaft 16 and is secured thereto at a location intermediate the front and rear bearings 22,23.

The shaft 25 has a flange 26 at its front end to which is bolted the fan disc 14. The disc 14 has a rearward projecting hollow cylindrical extension 27 by which the rotor 10 is secured to the inner race of a bearing 28 carried by the fixed structure 24 of the engine casing.

The bearing 28 comprises an inner race 29 mounted on the extension 27 of the disc 14, an outer race 30 spaced from an outer sleeve 31 carried by the fixed structure 24, and rollers 32 located between the inner and outer races 29,30. Means are provided for supplying oil to the gaps 33 between the outer race 30 and the outer sleeve 31 to maintain a squeeze film of oil. A suitable form of hydrodynamic squeeze film bearing is described in British Pat. No. 957,317.

Labyrinth oil seals 34 are provided to contain the oil. It will be seen that both bearings 23 and 28 constitute a single assembly which simplifies oil sealing and oil supply services.

If desired, flexible resilient rubber pads 35 may be provided between the extension 27 and shaft 25 and between the shafts 16 and 25 to provide shock absorbtion and damping.

Figure 3:
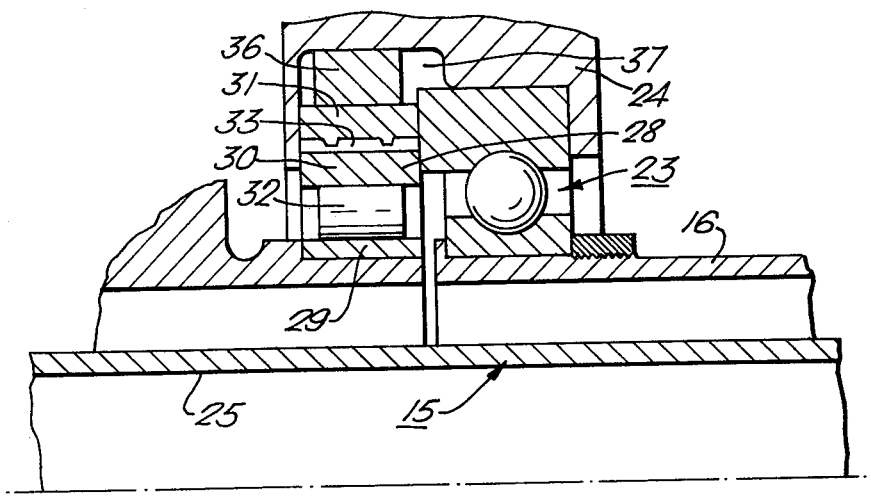
FIG. 3 illustrates two alternative bearing assemblies for supporting the front fan of the engine of FIG. 1.

FIG. 3 shows a modification to the first bearing 23 and the third bearing 28 of FIG. 2. In FIG. 3 a crushable or frangible support 36 is located in a chamber 37 between the structure 25 and the sleeve 31. The sleeve 31 is shortened to extend only over the axial length of the bearing 28. The crushable support 36 may be a plastically deformable material, such as foamed or expanded metal or cellular material or may be resilient elastic material such as rubber to provide damping. The normal squeeze film bearing is formed in the gap 33 as described in connected with FIG. 2. The chamber 37 may contained oil further to provide damping in the event that out-of-balance loads deflect the bearing 28 radially relative to the fixed structure 24.

Other ways of mounting the outer race 30 of bearing 28 relative to the fixed structure 24 may be possible. For example, a space may be formed between the sleeve 31 and the fixed structure 24 and the sleeve 31 held in place by frangible pins fixed to the structure 24.

A further damping means between the structure 24 and the sleeve 31 may take the form of making the sleeve 31, and the structure 24 of co-operating corrugated forms as described in British Pat. No. 1,284,602 and forming a film of pressurized oil between the co-operating surfaces.

I claim:
1. A rotor assembly comprising a torsionally stiff drive shaft mounted at two spaced locations in first and second bearing means which are substantially immovable bodily in radial directions; the drive shaft having a flexible end portion, projecting beyond the first bearing means, which is more flexible in bending than the span of the drive shaft between the first and second bearings; a support means mounted for rotation in a third bearing means; and a rotor mounted on the flexible end portion of the drive shaft to be driven thereby and also mounted on the support means for rotation in the third bearing means, the third bearing means being capable of accommodating radial deflections of the support means when the rotor becomes unbalanced.

2. A rotor assembly according to claim 1 wherein the first and third bearing means are assembled at a common location to define a common assembly.

3. A rotor assembly according to claim 1 wherein the third bearing means comprises a conventional roller or ball race thrust bearing mounted in a deformable mounting.

4. A rotor assembly according to claim 1 wherein the third bearing is a squeeze-film bearing.

5. A rotor assembly according to claim 1 preceding claims wherein the drive shaft is a hollow cylinder and the flexible end portion of the drive shaft comprises a second torsionally stiff shaft positioned in the bore of the drive shaft and secured at one end to the drive shaft at a location intermediate the first and second bearing means.

6. A rotor assembly according to claim 4 wherein the squeeze film is formed between the outer race of the bearing and an intermediate sleeve member which is itself spaced from fixed structure constituting a mounting for the bearing.

7. A rotor assembly according to claim 6 wherein the intermediate sleeve member is held relative to the fixed structure by shear pins designed to fail when the bearing is deflected bodily in a radial direction.

8. A rotor assembly according to claim 6 wherein a crushable member is located in the space between the intermediate sleeve member and the fixed structure.

9. A rotor assembly according to claim 6 wherein the space between the intermediate sleeve member and the fixed structure contains oil.

* * * * *